United States Patent [19]

Wagner

[11] 4,183,122
[45] Jan. 15, 1980

[54] U-BOLT CLAMP ASSEMBLY

[75] Inventor: Wayne M. Wagner, Apple Valley, Minn.

[73] Assignee: Donaldson Company, Inc., Minneapolis, Minn.

[21] Appl. No.: 940,851

[22] Filed: Sep. 8, 1978

[51] Int. Cl.² ............... F16L 33/10; B65D 63/00
[52] U.S. Cl. ................... 24/277; 113/116 H; 29/509
[58] Field of Search .............. 24/277, 276, 275; 113/116 H

[56] References Cited

U.S. PATENT DOCUMENTS

| 3,137,053 | 6/1964 | Osborn | 24/277 |
| 3,192,593 | 7/1965 | Osborn | 24/277 |
| 3,605,214 | 9/1971 | Spotts | 24/277 |
| 3,729,782 | 5/1973 | Downing | 24/277 |
| 3,772,745 | 11/1973 | Dowling | 24/277 |
| 3,879,815 | 4/1975 | Dowling | 24/277 |
| 3,919,747 | 11/1975 | Offterdinger | 24/277 |
| 4,040,152 | 8/1977 | Gilgallon | 24/277 |
| 4,056,869 | 11/1977 | Eisma | 24/277 |

Primary Examiner—Bernard A. Gelak
Attorney, Agent, or Firm—Merchant, Gould, Smith, Edell, Welter & Schmidt

[57] ABSTRACT

A saddle for a U-bolt clamp assembly is disclosed. The saddle is comprised of a single sheet metal member. The member is folded along a line to form a two-layer web portion and a pair of tubular portions. Each of the tubular portions receives a leg of a U-shaped bolt. Each tubular portion is formed of an inner layer of sheet metal which has substantially a 360° circumferential extent and an outer layer bent around the inner layer and which extends around at least a 180° circumferential extent. The outer layer thus serves to hold the saddle in a folded condition without the use of welds.

20 Claims, 19 Drawing Figures

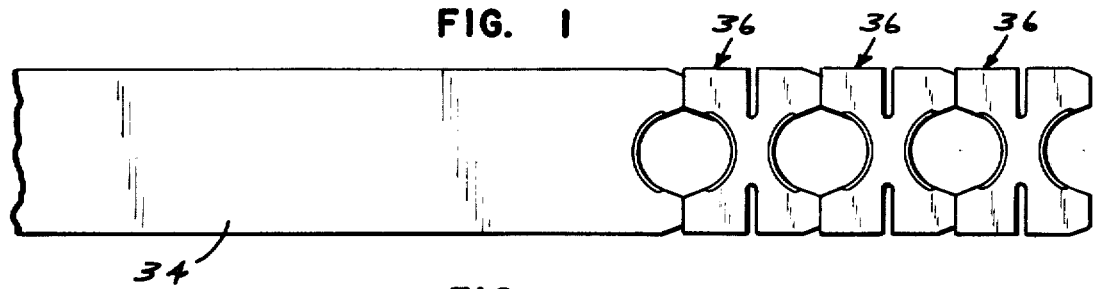
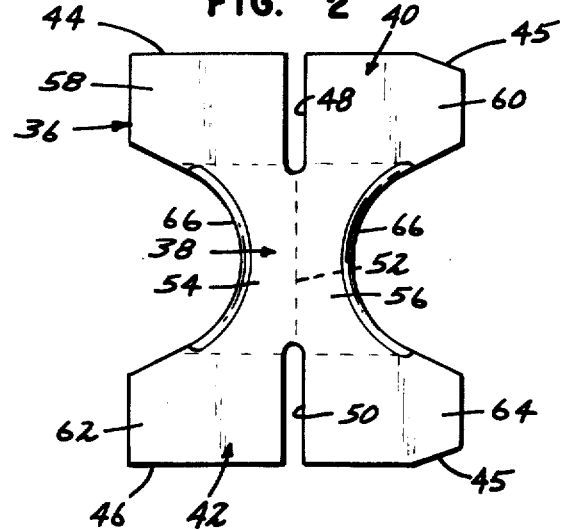
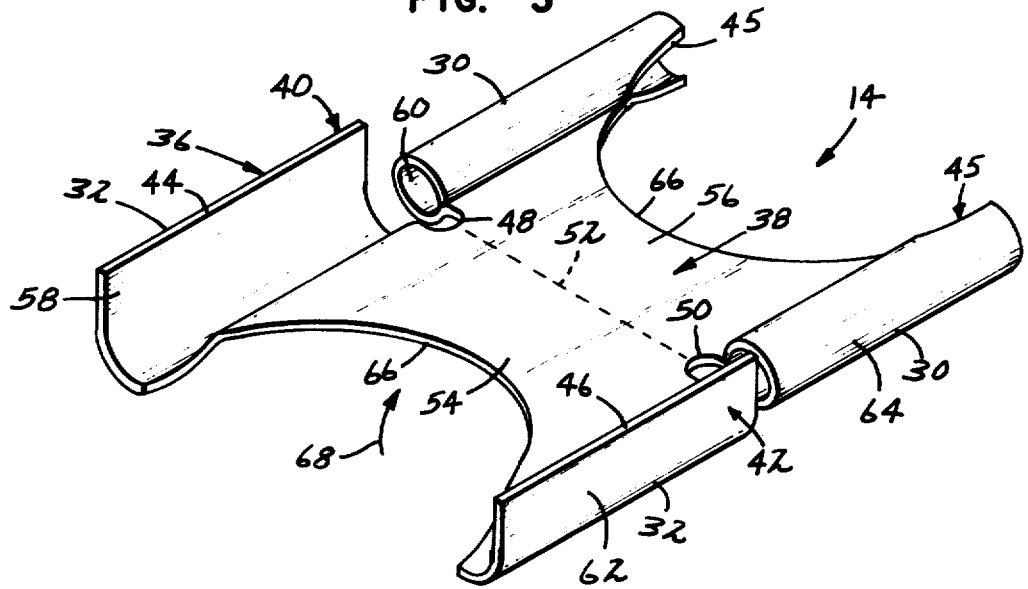

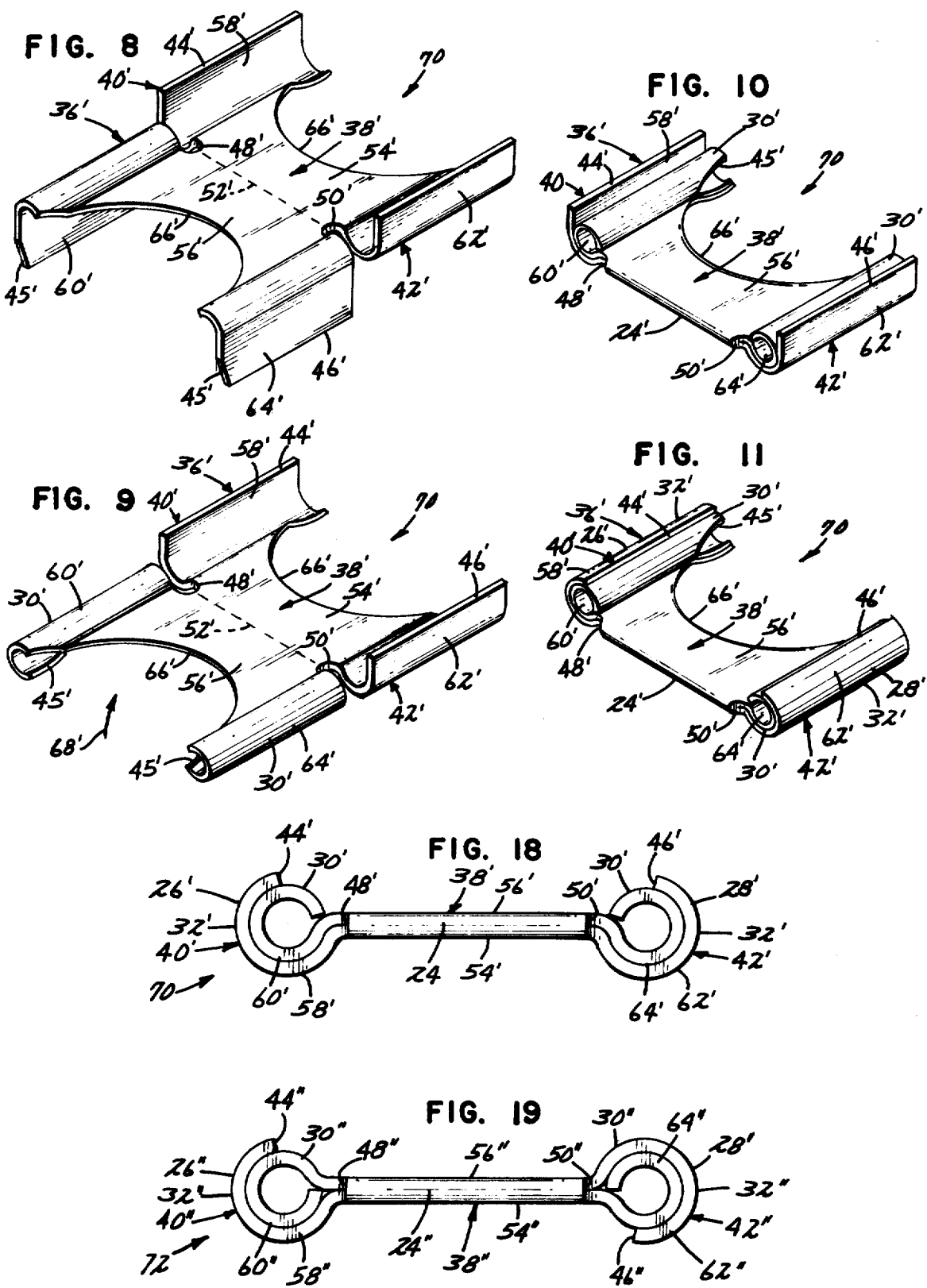

U-BOLT CLAMP ASSEMBLY

BACKGROUND OF THE INVENTION

The present invention relates to U-bolt clamp assemblies and more particularly to the construction of a saddle for use in such assemblies.

U-bolt clamps are used for joining together sections of tubing at a connection wherein one piece of tubing is telescoped within another. U-bolt clamps are commonly used to join various components of internal combustion engine exhaust systems, such as exhaust pipes, tail pipes, mufflers, etc. In order to secure the two pieces of tubing relative to one another, the curved portion of the U-bolt and the curved portion of the saddle are placed in contact with the tubing in the area of overlap. Thereafter the saddle is tightened down onto the U-bolt so that the two layers of overlapping tubing deform or crimp into one another. A large amount of force is required to cause the crimping and, hence, both the U-bolt and saddle must have sufficient strength to withstand such forces.

The U-bolts themselves generally have sufficient strength to withstand the forces required to crimp tubing being joined. However, problems have arisen with the saddle portion of the assemblies. Some of the prior art saddle assemblies have tended to twist when force sufficient to crimp tubing has been applied. Prior art U-bolt clamp assemblies have attempted to strengthen saddles in a number of ways. One method has been to double the thickness of the web area, either in full or partially. Another method has been to use flanges extending perpendicularly from the surface of the web sections. The construction of such prior art saddles has generally been complicated due to the requirement of welding of the various components. Examples of various prior art clamps are found in U.S. Pat. Nos. 3,137,053 to Osborn, et al., issued June 16, 1964; 3,192,593 to Osborn, et al., issued July 6, 1965; 3,605,214 to Spotts, et al., issued Sept. 20, 1971; 3,729,782 to Downing, issued May 1, 1973; 3,772,745 to Dowling, et al., issued Nov. 20, 1973; 3,879,815 to Dowling, et al., issued Apr. 29, 1975; 3,919,747 to Offterdinger, issued Nov. 18, 1975; 4,040,152 to Gilgallon, issued Aug. 9, 1977; and 4,056,869 to Eisma, Jr., issued Nov. 8, 1977.

In addition to the strength requirement, simplicity of construction is another important criterion for the saddles. While the prior art saddles may appear to be simple in construction, the requirement of welds can drive up the per unit cost of the saddles.

SUMMARY OF THE INVENTION

The present invention relates to a saddle for a U-bolt clamp assembly. The saddle is comprised of a single sheet metal member. The sheet metal member is folded to form a two-layer web portion and a pair of tubular portions. Each tubular porton is adapted to receive a leg of a U-shaped bolt. Each tubular portion is formed of two layers of said sheet metal around a major portion of the circumference of each tubular portion.

Each tubular portion is thus formed of an inner layer and an outer layer of the sheet metal. The inner layer extends around substantially a 360° circumferential extent, while the outer layer extends around at least a 180° circumferential extent. In one embodiment, the outer layers of the two tubular sections are both bent in the same rotative direction. The rotative direction is chosen such that it is in the same rotative direction in which nuts on the U-bolt will rotate when they are tightened down. In this manner, the outer layers will not tend to unwrap when the clamp is tightened down onto tubes to be joined.

The web portion of the saddle is two-layered over its entire area and the tubular portions are double-layered over a major portion of their circumference. The double layering of the web portion increases the strength of the web portion. The double layering of the tubular portion provides increased bearing surface for the nuts to tighten down upon and also secures the saddle in its folded condition without the use of welds. Since no welds are utilized to form the saddle, the method of construction is simplified.

Various advantages and features of novelty which characterize the invention are pointed out with particularity in the claims annexed hereto and forming a part hereof. However, for a better understanding of the invention, its advantages, and objects attained by its use, reference should be had to the drawings which form a further part hereof, and to the accompanying descriptive matter, in which there is illustrated and described several embodiments of the invention.

BRIEF DESCRIPTION OF THE DRAWINGS

FIG. 1 is a plan view of a strip of sheet metal material wherein a plurality of blanks have been stamped for producing saddles in accordance with the present invention;

FIG. 2 is a plan view of a single piece of sheet metal material from which a clamp in accordance with the present invention is made;

FIGS. 3–5 are perspective views illustrating steps of a method for making a first embodiment of a saddle in accordance with the present invention;

FIGS. 8–11 are perspective views illustrating steps of a method for making a second embodiment of a saddle in accordance with the present invention;

FIG. 18 is an end view of the embodiment of the saddle shown in FIG. 11; and

FIG. 19 is an end view of the embodiment of the saddle shown in FIG. 16.

DETAILED DESCRIPTION OF THE INVENTION

Figure 6:
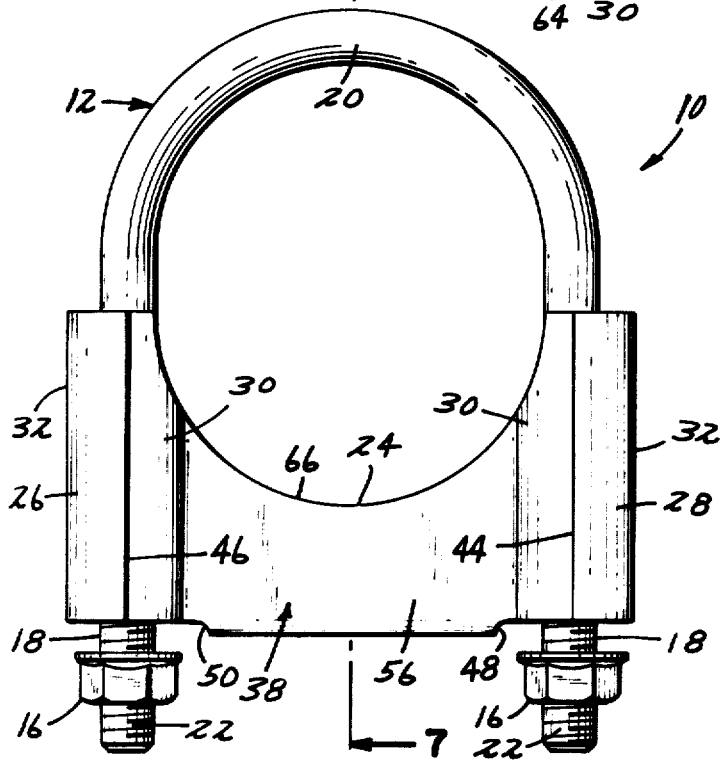
FIG. 6 is a front elevational view of a saddle and U-bolt forming a U-bolt assembly in accordance with the present invention.
Figure 7:
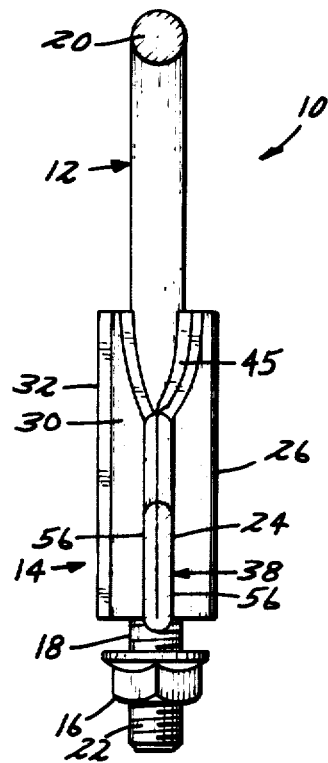
FIG. 7 is a sectional view taken along line 7—7 of FIG. 6.
Figure 13:
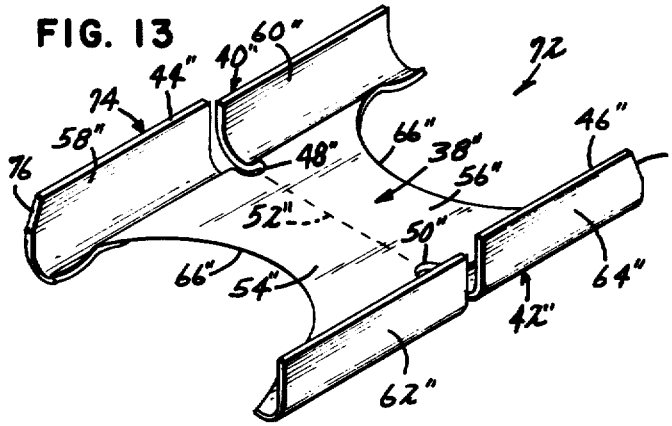
FIGS. 13–16 are perspective views illustrating steps of a method for making a third embodiment of a saddle in accordance with the present invention.
Figure 12:
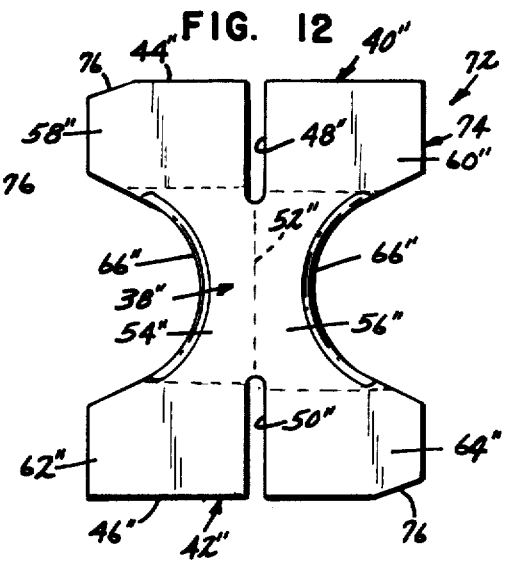
FIG. 12 is a plan view of a single piece of sheet metal material configured to form a third embodiment of a saddle in accordance with the present invention.
Figure 14:
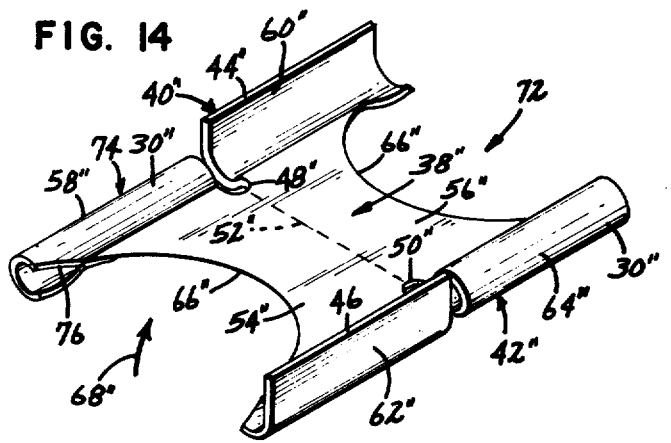

Referring to the drawings in detail, wherein like numerals indicate like elements, there is shown in FIG. 6 a U-bolt clamp assembly in accordance with the present invention generally designated as 10. The U-bolt clamp assembly 10 is comprised of a U-bolt 12, a saddle 14, and a pair of nuts 16. The U-bolt 12 has a pair of legs 18 generally parallel to one another which are interconnected by a curvilinear section 20. Each leg 18 has a threaded end 22 onto which the nuts 16 are threaded.

The saddle 14 has a two-layered web portion 24 and a pair of tubular portions 26, 28. The web portion 24 is double- or two-layered through its entire area. Each tubular portion 26, 28 has an inner layer 30 and an outer layer 32. The inner layer 30 has a circumferential extent of substantially 360° and thus forms a complete tube through which a leg 18 can pass. The outer layer 32 is bent to form a partial tube and extends around a circumferential extent of at least 180°.

The method of forming the saddle 14 can best be understood by referring to FIGS. 1-5. A strip or portion of a roll of sheet metal material 34 is shown in FIG. 1. A plurality of single-piece sheet metal members 36 are cut or formed from the strip 34. A single member 36 is shown in FIG. 2. The sheet metal members 36 can be cut or stamped from the strip 34 in any conventional manner.

Each sheet metal member 36 has a central section 38, an end section 40 on one side of the central section 38, and an end section 42 on the other side of the central section 38. The sheet metal member 36 also has a pair of opposing side edges 44, 46. A slit or cut-out 48 extends inwardly from the side edge 44 toward the central section 48 and a slit 50 extends inwardly from the side edge 46 toward the central section 48. A fold line 52 extends between and is aligned with the slits 48, 50. The slits 48, 50 and the line 52 divide the member 36 generally in half into a first portion and a second portion. That is, the central section 38 is divided into a first portion 54 and a second portion 56; the end section 40 is divided into a first portion 58 and a second portion 60; and the end section 42 is divided into a first portion 62 and a second portion 64. The second portions 60, 64 have outer trimmed edges 45. The first and second portions 54, 56 of the central section 38 each have an outer curvilinear edge 66. When the member 36 is folded into its final form, the curvilinear edges 66 form the lip of the web portion 24.

Figure 4:
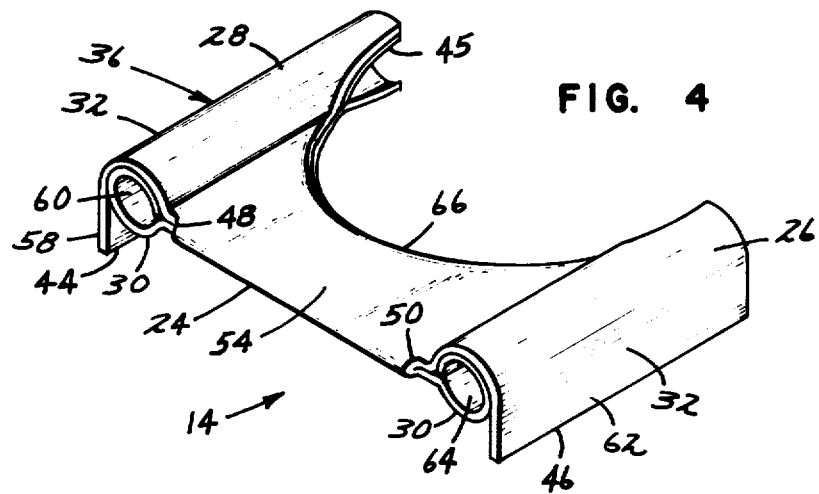
Figure 5:
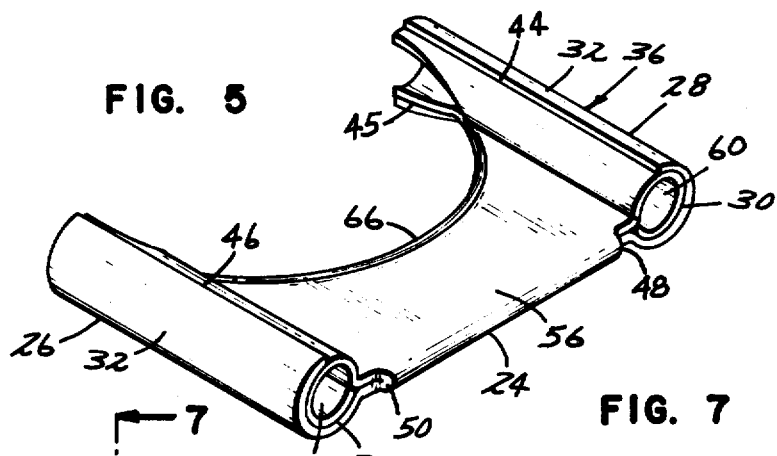

The method of forming the saddle 14 is best illustrated in FIGS. 3-5. The portions 60, 64 of the end sections 40, 42 are bent upwardly and around in opposite rotative directions to form the tubes of the inner layers 30. The portions 58, 62 of the end sections 40, 42 are bent in part to form curved receiving areas for the inner layers 30. See FIG. 3.

The first and second portions of the member 36 are thereafter folded along the fold line 52 as shown by arrow 68 in FIG. 3. As is shown in FIG. 4, the first and second portions are folded into one another so that the inner layer 30 is received within the curved areas of portions 58, 62 and so that a two-layered web portion 24 is formed. The diameter of the inner surface of the portions 58, 62, which form the curved receiving areas, is slightly greater than the diameter of the outer surface of the inner layers 30. In this manner, when the member 36 is folded, the inner layers 30 fit flush within the curved areas of the portions 58, 62.

Finally, the remaining unbent areas of the portions 58, 62 are bent around the inner layers 30 to form the outer layers 32. Since the outer layer 32 wraps around the inner layer 30 of each tubular portion 26, 28, no welds are required to secure the saddle 14 in its folded form. As is best seen in FIG. 5, the two inner layers 30 are bent in opposite rotative directions from one another and the two outer layers 32 are also bent in opposite rotative directions from one another. The inner and outer layers 30, 32 of the tubular portion 26 are bent in opposite rotative directions to one another, as are the layers 30, 32 of the tubular portion 28.

There is illustrated in FIG. 11 a second embodiment of a saddle in accordance with the present invention designated generally as 70. The method of forming or making the saddle 70 is illustrated in FIGS. 8-11. Portions of the saddle 70 which are similar to portions of the saddle 14 will be indicated by like primed numbers.

The saddle 70 is formed from a single-piece sheet metal member 36'. The member 36' has the same configuration as member 36. The first portions 60', 64' are bent downwardly and the second portions 58', 62' are bent upwardly. See FIG. 8. Thereafter, the first portions 60', 64' are bent to form a closed tube of substantially 360° circumferential extent. The first portions 60', 64' thus form the inner layers 30'. Thereafter, the first and second portions of the member 36' are folded about the line 52' in the direction of arrow 68'. See FIG. 9.

The diameter of the inner surface of the portions 58' 62', which form the curved receiving areas, is slightly greater than the diameter of the outer surface of the inner layers 30'. In this manner, when the member 36' is folded, the inner layers 30' fit flush within the curved areas of the portions 58', 62'. See FIG. 10. The second portions 58', 62' are thereafter bent around the inner layers 30' to complete the outer layers 32'. See FIG. 11. In the saddle 70, the inner and outer layers 30', 32' of the tubular portion 26' are both in the same rotative direction. The inner and outer layers 30', 32' of the tubular portion 28' are both in the same rotative direction, which is opposite from the rotative direction of the inner and outer layers 30', 32' of the tubular portion 26'.

Figure 16:
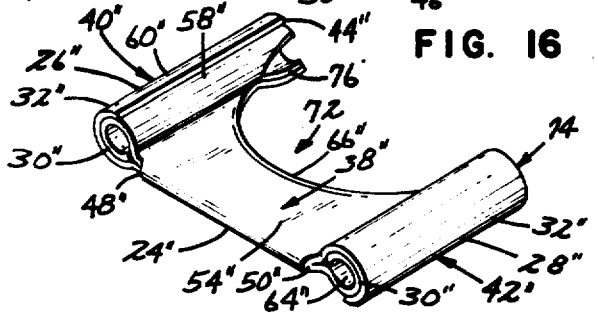

There is illustrated in FIG. 16 a third embodiment of a saddle in accordance with the present invention designated generally as 72. The method of forming or making the saddle 72 is illustrated in FIGS. 13-16. Portions of the saddle 72 which are similar to portions of the saddle 14 will be indicated by like double-primed numbers.

The saddle 72 shown in FIG. 16 is formed from a single-piece sheet metal member 74. The member 74 is similar to the members 36, 36' in all aspects except for the location of trimmed edges 76. In the member 74, the trimmed edges 76 are on opposite portions of the member 74, while in the members 36, 36' the trimmed edges 45 are on the same portion of the member 36, 36'.

The first portions 58", 62" and the second portions 60", 64" are all bent upwardly. See FIG. 13. The first portion 58" and the second portion 64", which are on the opposite sides of fold line 52" and diagonally across from one another, are both thereafter bent completely around to form a closed tube having a circumferential extent of substantially 360°. Inner layers 30" are thus formed. See FIG. 14. The member 74 is thereafter folded along fold line 52" in the direction of arrow 68".

The diameter of the inner surface of the portions 60", 62", which form the curved receiving areas, is slightly greater than the diameter of the outer surface of the inner layers 30". In this manner, when the member 74 is folded, the inner layers 30" fit flush within the curved areas of the portions 60", 62". See FIG. 15. The portions 60", 62" thereafter are bent completely around the inner layers 30" to form the outer layers 32". See FIG. 16. The direction of rotation of both the outer layers 32" is the same and is chosen such that the rotative direction is the same as the rotative direction of the nuts 16 to be threaded on the U-bolt legs 18 which are received in the tubular portions 26", 28". Thus, when the nuts are tightened down, the nuts tend to hold the outer layers 32" in position, rather than to unwrap the outer layers 32". The inner layers 30" are also bent in one rotative direction. However, the rotative direction in which the inner layers 30" are bent is opposite from the rotative direction in which the outer layers 32" are bent.

Figure 17:
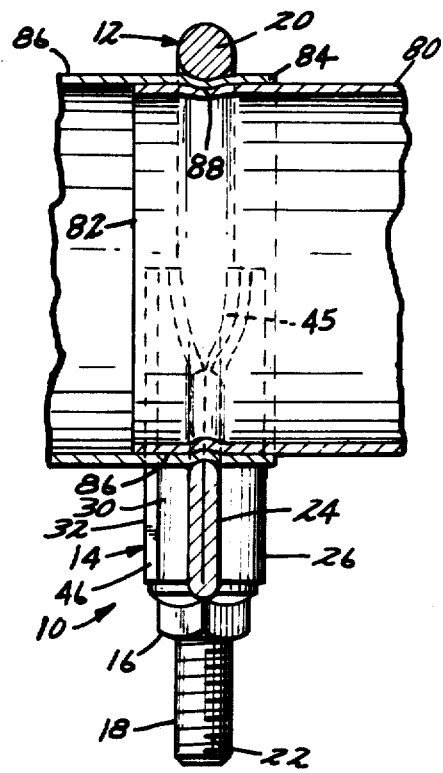
FIG. 17 is a sectional view illustrating a U-bolt assembly securing together two tubular members.
Figure 15:
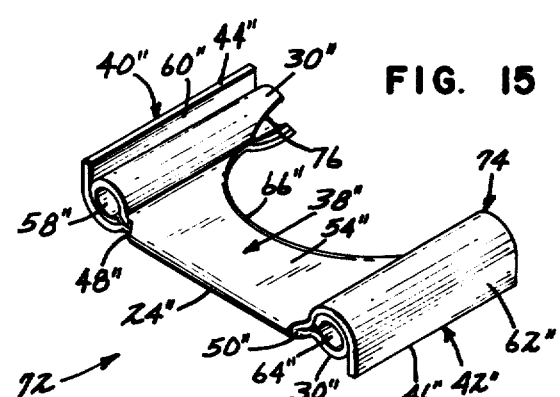

The use of a U-bolt clamp assembly 10 is illustrated in FIG. 17. A first tube 80 has an end 82 which is received within an end 84 of a second tube 86. A U-bolt 12 and a saddle 14 are placed about an overlapping area 86 of the ends 82, 84. The nuts 16 are then threaded onto the legs 18 of the U-bolt 12 until the lip of the saddle 14 and the curvilinear section 20 of the U-bolt 12 are tightened down upon the ends 82, 84 with a sufficient degree to cause a crimp joint 88 within the area 86. Both the lip of the saddle and the curvilinear section 20 are preferably arcs of circles and thus mate with the outer circumference of cylindrical tubes.

Numerous characteristics and advantages of the invention have been set forth in the foregoing description, together with details of the structure and function of the invention, and the novel features thereof are pointed out in the appended claims. The disclosure, however, is illustrative only, and changes may be made in detail, especially in matters of shape, size, and arrangement of parts, within the principle of the invention, to the full extent indicated by the broad general meaning of the terms in which the appended claims are expressed.

What is claimed:

1. A saddle for a U-bolt clamp assembly comprising a single sheet metal member, said member being folded to form a two-layer web portion and a pair of tubular portions, each tubular portion being adapted to receive a leg of a U-shaped bolt, and each tubular portion being formed of two layers of said sheet metal around a major portion of the circumference of each tubular portion.

2. A saddle for a U-bolt clamp assembly in accordance with claim 1 wherein said single sheet metal member in an unfolded condition has a pair of side edges and said sheet metal member is folded along a line extending in a direction between said side edges, said line dividing said member into a first and a second portion, said member including a slit extending inwardly from each side edge in alignment with said fold line.

3. A saddle for a U-bolt clamp assembly in accordance with claim 2 wherein said web portion is formed of a central section of said first and second portions, said central section having a curvilinear edge in said first and second portions forming a lip of said web portion, said lip being adapted to contact a surface to be clamped.

4. A saddle for a U-bolt clamp assembly in accordance with claim 3 wherein said first portion includes an end section on each side of said central section and said second portion includes an end section on each side of said central section, said end sections of said first portion being separated from said end sections of said second portion by said slits, said end sections of said first portion being bent to form an inner layer of said two-layer tubular portions, and said end sections of said second portion being bent about said inner layer to form an outer layer of said two-layer tubular portions.

5. A saddle for a U-bolt clamp assembly in accordance with claim 3 wherein said first portion includes an end section on each side of said central section and said second portion includes an end section on each side of said central section, said end sections of said first portion being separated from said end sections of said second portion by said slits, one of said end sections of said first portion and one of said end sections of said second portion being bent to form an inner layer of said two-layer tubular portions, and the other of said end sections of said first portion and said second portion being bent about said inner layer to form an outer layer of said two-layer tubular portions.

6. A saddle for a U-bolt clamp assembly in accordance with claim 5 wherein each of said outer layers in a folded condition of said member is bent in a same rotative direction whereby a nut threaded on each leg of a U-shaped bolt which is used with said saddle turns in the rotative direction in which said outer layers are bent.

7. A saddle for a U-bolt clamp assembly in accordance with claim 4 or 6 wherein said inner layer forms a tube of substantially 360° circumferential extent and said outer layer forms a partial tube of at least 180° circumferential extent.

8. A U-bolt clamp assembly comprising:
a generally U-shaped bolt having a pair of generally parallel legs interconnected by a curvilinear section, each of said legs having a threaded end for receiving a nut;
a saddle formed of a single sheet metal member folded to form a two-layer web portion and a pair of tubular portions, each tubular portion being adapted to receive one of said legs, each tubular portion being formed of an inner layer of said sheet metal member having a circumferential extent of substantially 360° and an outer layer of said sheet metal member bent around at least 180° of said inner layer to hold said saddle in a folded state; and
a nut for threading onto each of said legs to secure said bolt and said saddle together.

9. A U-bolt clamp assembly in accordance with claim 8 wherein said single sheet metal member in an unfolded condition has a pair of side edges and said sheet metal member is folded along a line extending in a direction between said side edges, said line dividing said member into a first and a second portion, said member including a slit extending inwardly from each side edge in alignment with said fold line.

10. A U-bolt clamp assembly in accordance with claim 9 wherein said web portion is formed of a central section of said first and second portions, said central section having a curvilinear edge in said first and second portions forming a lip of said web portion, said lip being adapted to contact a surface to be clamped.

11. A U-bolt clamp assembly in accordance with claim 10 wherein said first portion includes an end section on each side of said central section and said second portion includes an end section on each side of said central section, said end sections of said first portion being separated from said end sections of said second portion by said slits, said end sections of said first portion being bent to form an inner layer of said two-layer tubular portion and said end sections of said second portion being bent to form an outer layer of said tubular portion about said inner layer.

12. A U-bolt clamp assembly in accordance with claim 10 wherein said first portion includes an end section on each side of said central section and said second portion includes an end section on each side of said central section, said end sections of said first portion being separated from said end sections of said second portion by said slits, one of said end sections of said first portion and one of said end sections of said second portion being bent to form an inner layer of said two-layer tubular portions, and the other said end sections of said first and second portions being bent about said inner layer to form an outer layer of said two-layer tubular portions.

13. A saddle for a U-bolt clamp assembly comprising a single sheet metal member, said member being folded to form a two-layer web portion and a pair of tubular portions, each tubular portion being adapted to receive a leg of a U-shaped bolt, and each tubular portion being formed of an inner layer and an outer layer, said outer layers being bent in the same rotative direction and extending around a major portion of said inner layers to hold said saddle in a folded condition.

14. A saddle for a U-bolt clamp assembly in accordance with claim 13 wherein said inner layers are bent in the same rotative direction and have a circumferential extent of substantially 360° and said outer layers each have a circumferential extent of at least 180°.

15. A saddle for a U-bolt clamp assembly having a two-layer web portion and a pair of tubular portions each having an inner layer and an outer layer made by a method comprising the steps of:
 (a) providing a single piece sheet metal member having a pair of opposing side edges, a central section, and an end section on either side of said central section;
 (b) dividing each end section into a first and a second portion by a slit extending inwardly from each side edge toward said central section;
 (c) bending two portions of said end sections along opposite side edges to form an inner layer for each tubular portion;
 (d) bending a part of each of the remaining two portions of said end sections to a curvilinear form having an inner circumference for receiving the inner layer of the tubular portions;
 (e) folding said sheet metal member along a line extending between and substantially in alignment with said slits to form a two-layered web portion of the saddle; and
 (f) bending the remaining part of each of said remaining two portions of said end section to encircle the first layer of said tubular portions and to complete a second layer of said tubular portions.

16. A saddle made in accordance with the method of claim 15 wherein step (c) includes bending two portions of said end sections on one side of said slits and steps (d) and (f) including bending the two portions of said end sections on the other side of said slits.

17. A saddle made in accordance with the method of claim 16 wherein step (c) includes bending said two portions of said end sections on the first side of the slits upwardly and step (d) includes bending said two portions of said end sections on the other side of said slits upwardly.

18. A saddle made in accordance with the method of claim 16 wherein step (c) includes bending said two portions of said end sections on the first side of the slits downwardly and step (d) includes bending said two portions of said end sections on the other side of said slits upwardly.

19. A saddle made in accordance with the method of claim 15 wherein step (c) includes bending the first portion of a first end section on one side of said central section and bending the second portion of a second end section on the other side of said central section, and steps (d) and (f) include bending the other two portions of said end sections.

20. A saddle made in accordance with the method of claim 19 wherein steps (d) and (f) include bending the other two portions of said end sections in a direction such that after said member is folded said other two portions of said end sections are bent in the same rotative direction.

* * * * *